United States Patent

Kato et al.

[11] Patent Number: 5,861,611
[45] Date of Patent: Jan. 19, 1999

[54] ELECTRICALLY HEATABLE HONEYCOMB BODY AND HONEYCOMB UNIT COMPRISING SAID HONEYCOMB BODY

[75] Inventors: Yasushi Kato, Handa, Japan; Shigeharu Hashimoto, Farmington Hills, Mich.; Takahisa Kaneko, Farmington Hills, Mich.; Yuji Deguchi, Farmington Hills, Mich.

[73] Assignee: NGK Insulators, Ltd., Japan

[21] Appl. No.: 678,190

[22] Filed: Jul. 11, 1996

[30] Foreign Application Priority Data

Jul. 21, 1995 [JP] Japan .................................. 7-185308

[51] Int. Cl.⁶ ................................ H05B 3/06; B60L 1/02; F01N 3/10
[52] U.S. Cl. .......................... 219/552; 219/205; 60/300; 422/174
[58] Field of Search ...................... 219/552, 553; 392/485, 488; 55/DIG. 30; 422/168, 171, 173, 174; 60/299, 300, 301, 302, 303

[56] References Cited

U.S. PATENT DOCUMENTS

| | | | |
|---|---|---|---|
| 5,063,029 | 11/1991 | Mizuno et al. | 422/175 |
| 5,202,547 | 4/1993 | Abe et al. | 219/552 |
| 5,202,548 | 4/1993 | Kondo et al. | 219/552 |
| 5,254,840 | 10/1993 | Thompson | 219/544 |
| 5,318,757 | 6/1994 | Abe et al. | 422/174 |
| 5,399,841 | 3/1995 | Abe et al. | 219/552 |
| 5,526,462 | 6/1996 | Kondo et al. | 219/552 |
| 5,651,088 | 7/1997 | Abe et al. | 219/552 |

FOREIGN PATENT DOCUMENTS

| | | |
|---|---|---|
| 0 465 184 A1 | 1/1992 | European Pat. Off. . |
| 0 502 731 A1 | 9/1992 | European Pat. Off. . |
| WO 93/21430 | 10/1993 | WIPO . |

Primary Examiner—Teresa J. Walberg
Assistant Examiner—Sam Paik
Attorney, Agent, or Firm—Parkhurst & Wendel L.L.P.

[57] ABSTRACT

An electrically heatable honeycomb body includes a large number of passages which are defined by partition walls made of an electroconductive material and which are substantially parallel to the direction of a gas flowing through the honeycomb body, and two ends which are the gas inlet and outlet sides of honeycomb body. At least one slit is formed to control, upon electrification of honeycomb body, the flow of electricity therein and consequently the heat generation therein. In order to make lower the temperature of the end of each outer slit close to each of the electrodes attached to the honeycomb body, than the temperature of the center of honeycomb body or the temperature of the end of each inner slit, the thickness of partition walls is made larger at the intersection points of partition walls, in the passages surrounding said end of each outer slit, or the cell number between two adjacent slits is made larger in outer slits close to each of the electrodes attached to the honeycomb body, than in inner slits. This honeycomb body can prevent cell rupture from occurring during repeated electrification and has excellent durability.

5 Claims, 6 Drawing Sheets

CELL NUMBER BETWEEN TWO
ADJACENT SLITS

CELL NUMBER BETWEEN
TWO ADJACENT SLITS
IS 3 IN ANY PORTION

CIRCULAR    RACE TRACK

ELECTRICALLY HEATABLE HONEYCOMB BODY AND HONEYCOMB UNIT COMPRISING SAID HONEYCOMB BODY

BACKGROUND OF THE INVENTION (1) Field of the Invention

The present invention relates to an electrically heatable honeycomb body and a honeycomb unit comprising the honeycomb body. More particularly, the present invention relates to a honeycomb body favorably used as a honeycomb heater for, for example, purification of the exhaust gas emitted during the cold start of automobile; as well as to a honeycomb unit comprising the honeycomb body.

(2) Description of the Related Art

In recent years, metallic honeycomb structures have drawn attention as a catalyst, a catalyst carrier or the like used for purification of the nitrogen oxides (NOx), carbon monoxide (CO) and hydrocarbons (HC) present in the exhaust gases emitted from the internal engines of automobiles, etc.

As the control for such exhaust gases has become stricter, development of a heater, etc. capable of reducing the emission during the cold start of engine has become more necessary.

In order to respond to such necessity, the present applicant proposed heaters such as mentioned below.

In U.S. Pat. No. 5,318,757 was proposed a honeycomb heater comprising (a) a honeycomb structure and (b) electrodes, wherein slits as a resistance-adjusting means were provided in the honeycomb structure between the electrodes. This heater can quickly heat the low-temperature exhaust gas emitted during engine start.

In U.S. Pat. No. 5,202,547 were proposed a honeycomb heater as shown in FIG. 10, wherein the partition wall "a" at the dead end of each slit 100 (where a current is concentrated most) and the partition walls "b" at the both sides of each slit (where a current is concentrated at a relatively high degree) were made thicker with an electroconductive material; and a honeycomb heater as shown in FIG. 11, wherein the passages "d", "f" and "h" (where a current is concentrated) were sealed with an electroconductive material. In these honeycomb heaters, however, cell rupture occurred at times when heating by electrification was repeated frequently.

In U.S. Pat. No. 5,399,841 was proposed a honeycomb heater wherein the polygonal section of each cell undergoing larger thermal shock and generating a higher thermal stress was formed so as to have a side of 10 mm or less in order to relax the thermal shock and prevent the deformation, cracking, etc. of the cell. However, when this honeycomb heater was actually electrified, cell deformation occurred at the cells of the both sides of each slit end where current concentration took place, and a higher stress appeared at these cells. Therefore, it is necessary to take an appropriate countermeasure to prevent the deformation of such cells and reduce their thermal stress.

In U.S. patent application No. 08/357,213 (European Patent Publication 0 661 097) was proposed a honeycomb heater whose thickness in the direction of gas flow was made smaller at a particular position so as to allow quick local heating. In this heater, however, since the thickness changes sharply from that particular position, current concentration occurred at that position at times during electrification.

As described above, when a honeycomb structure is electrified, there appears (appear) a current-concentrating portion(s). Such portion(s) is (are) in the vicinity of each slit end in the case of a honeycomb structure having a slit(s) and, in the case of a honeycomb structure of vortex type, the center thereof. When the honeycomb structure is subjected to repeated electrification, cell rupture occurs at the current-concentrating portion(s) of the honeycomb structure, which may finally lead to no flow of electricity.

OBJECT AND SUMMARY OF THE INVENTION

The object of the present invention is to provide a honeycomb heater showing higher resistance to cell rupture when subjected to repeated electrification.

According to the present invention there is provided an electrically heatable honeycomb body comprising:

a large number of passages which are defined by partition walls made of an electroconductive material and which are substantially parallel to the direction of a gas flowing through the honeycomb body, two ends which are the gas inlet and outlet sides of honeycomb body, and at least one slit which is formed to control, upon electrification of the honeycomb body, the flow of electricity therein and consequently the heat generation therein, wherein said slit is formed so that the temperature of the end of each outer slit close to each of the electrodes attached to the honeycomb body becomes lower than the temperature of the center of honeycomb body or the temperature of the end of each inner slit.

According to the present invention there is further provided an electrically heatable honeycomb body comprising:

a large number of passages which are defined by partition walls made of an electroconductive material and which are substantially parallel to the direction of a gas flowing through the honeycomb body, two ends which are the gas inlet and outlet sides of honeycomb body, and at least one slit which is formed to control, upon electrification of the honeycomb body, the flow of electricity therein and consequently the heat generation therein, wherein said honeycomb body has a circular, race track-like or oval cross-sectional shape in the direction normal to the direction of a gas flowing through the honeycomb body.

According to the present invention there is furthermore provided a honeycomb unit comprising:

a honeycomb body comprising a large number of passages which are defined by partition walls made of an electroconductive material and which are substantially parallel to the direction of a gas flowing through the honeycomb body, and two ends which are the gas inlet and outlet sides of honeycomb body, and a metallic casing containing said honeycomb body via a ring-shaped supporting member, wherein the honeycomb body and the ring-shaped supporting member are not bonded at the circumference portions of the honeycomb body, close to the electrodes attached to the honeycomb body.

DETAILED DESCRIPTION OF THE INVENTION

Figure 1:
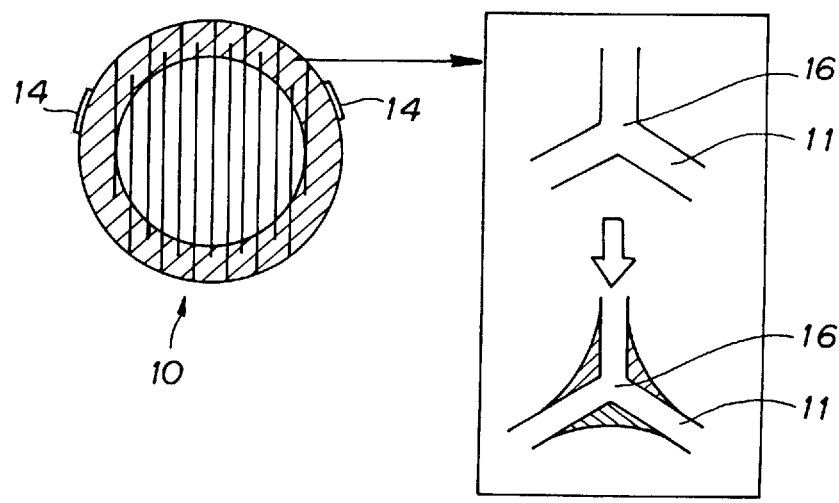
FIG. 1 is a sectional view of an example of the honeycomb body of the present invention wherein the partition wall thickness of cells in the vicinity of each outer-slit end is made larger at each intersection point of partition walls.

In the present invention, improvements of electrically heatable honeycomb body have been made on the honeycomb body portion wherein a higher temperature, a higher thermal stress and cell rupture appear owing to the current concentration taking place during electrification. The improvements have been with a view to make lower the temperature and thermal stress of said honeycomb body portion than those of the honeycomb body center.

Further in the present invention, by allowing an electrically heatable honeycomb body to have a race track-like or oval sectional shape in the direction normal to the direction of a gas flowing through the honeycomb body, the honeycomb body has a higher natural frequency and consequently has a higher resistance to vibration during actual use.

Furthermore in the present invention, by, in fixing an electrically heatable honeycomb body to a metallic casing via a ring-shaped supporting member, allowing the honeycomb body and the ring-shaped supporting member not to be bonded to each other at the circumferential portion of honeycomb body close to each electrode attached to the honeycomb body, in order to relax the constraint of the honeycomb body, cell rupture hardly occurs during repeated electrification, resulting in improved durability.

In the present invention, in order to make lower the temperature of the end of each outer slit close to each of the electrodes attached to the honeycomb body, than the temperature of the honeycomb body center or the temperature of each inner-slit end, the following approaches are taken, for example.

(1) In the passages surrounding each outer-slit end close to each of the electrodes attached to the honeycomb body, the thickness of partition walls is made larger at the intersection points of partition walls.

(2) The cell number between two adjacent slits is made larger in outer slits close to each of the electrodes attached to the honeycomb body, than in inner slits.

In the present honeycomb body, the temperature of the end of each outer slit close to each of the electrodes attached to the honeycomb body is made lower by at least 50° C., preferably 100° C. than the temperature of the center of the honeycomb body or the temperature of the end of each inner slit.

Herein, "the temperature of the center of the honeycomb body or the temperature of the end of each inner slit" is the temperature of the honeycomb body portion showing the highest temperature owing to current concentration. Generally, the end of each inner slit shows the highest temperature of the honeycomb body; however, in some cases, the center of the honeycomb body shows the highest temperature depending upon the structure of honeycomb body or the structure of slits formed therein. Therefore, the above expression has been used for the temperature of the honeycomb body portion showing the highest temperature owing to current concentration.

In the present electrically heatable honeycomb body comprising a large number of passages, the temperature of the honeycomb body portion which is liable to cause cell rupture during repeated electrification, is made lower than the temperature of the honeycomb body center to prevent cell rupture.

Figure 10:
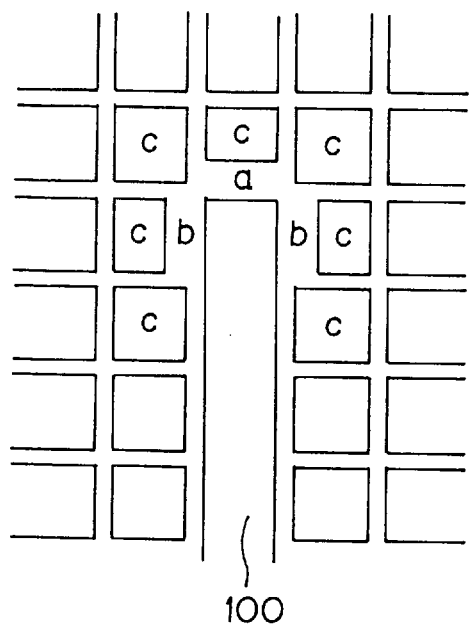
FIG. 10 is a part drawing of a conventional honeycomb body, showing an example of the structure of the end of each slit formed in the honeycomb body.
Figure 11:
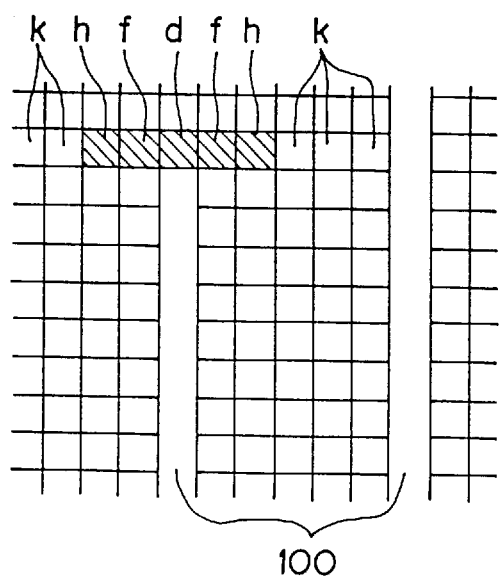
FIG. 11 is a part drawing of a conventional honeycomb body, showing an example of the structure of the end of each slit formed in the honeycomb body.

In a conventional resistance-adjusting type honeycomb heater as shown in FIG. 10, abnormally high heat generation is prevented by increasing the thicknesses of the partition walls "a" and "b" where current concentration takes place, or by sealing the passages of each current-concentrating portion with an electroconductive material. As mentioned previously, however, a detailed study by the present applicant indicated that the portions showing a larger temperature increase during electrification are the cells located at the both sides of each slit end and that the above countermeasure for abnormally high heat generation is insufficient and may have durability problems (e.g. cracking) in long-term use. Also in a conventional honeycomb heater as shown in FIG. 11, not only the cell at the dead end of each slit but also the few cells adjacent thereto in a direction perpendicular to the direction of slit extension are sealed with an electroconductive material. However, it was found that in this heater, a current flows obliquely upward to each slit end and then obliquely downward therefrom.

In the present invention, in-depth investigation was made with respect to which honeycomb body portion cell rupture occurs easily during repeated electrification; as a result, it was found that cell rupture occurs in the vicinity of the end of each outer slit close to each of the electrodes attached to the honeycomb body; therefore, the temperature of said end of each outer slit was made lower than the temperature of the end of each inner slit, whereby the resulting honeycomb body could have improved durability to cell rupture when subjected to repeated electrification.

The material constituting the present honeycomb body is not restricted as long as it is a material capable of generating heat when electrified, i.e. an electroconductive material. It my be a metal or a ceramic with a metal being preferred for its mechanical strength. The honeycomb body made of a metal includes, for example, those made of stainless steel or a material having a composition represented by Fe-Cr-Al, Fe-Cr, Fe-Al, Fe-Ni, W-Co, Ni-Cr or the like. Of these honeycomb bodies, those made of Fe-Cr-Al, Fe-Cr or Fe-Al are preferred because of excellent heat resistance, oxidation resistance and corrosion resistance and low cost. The honeycomb body may be porous or nonporous. When a catalyst is loaded thereon, a porous honeycomb body is preferred because it has higher adhesivity to the catalyst layer loaded thereon and hardly gives rise to the peeling of the catalyst layer caused by the difference in thermal expansion between the honeycomb body and the catalyst layer.

Next, description is made on an example of the process for production of a metallic honeycomb body used as one type of the honeycomb body of the present invention.

First, a material metal powder is prepared using, for example, a Fe powder, an Al powder and a Cr powder, or a powder of an alloy thereof so that they give a desired composition. The material metal powder is then mixed with an organic binder (e.g. methyl cellulose or polyvinyl alcohol) and water. The resulting mixture is subjected to extrusion to obtain a honeycomb body of desired shape.

In the above mixing, it is preferable that the material metal powder is mixed with an antioxidant (e.g. oleic acid) before being mixed with an organic binder and water, or that a material metal powder processed so as to have oxidation resistance is used.

The honeycomb body is fired at 1,000°–1,400° C. in a non-oxidizing atmosphere. Use of a non-oxidizing atmosphere containing hydrogen is preferable because the organic binder is decomposed and removed by the help of the catalytic action of Fe, etc. and, as a result, an excellent sintered honeycomb body is obtained.

When the firing temperature is lower than 1,000° C., the honeycomb body is not sintered. When the firing temperature is higher than 1,400° C., the sintered body obtained is deformed.

Preferably, the surfaces of the partition walls and pores of the sintered honeycomb body are coated with a heat-resistant metal oxide such as $Al_2O_3$, $Cr_2O_3$ or the like so that the honeycomb body can have improved heat resistance, oxidation resistance and corrosion resistance.

In the thus obtained honeycomb body is formed, for example, at least one slit as a resistance-adjusting means. As in the prior art, the slit can be formed in various directions, various positions and various lengths.

The thus obtained metallic honeycomb body is provided with an electrification means (e.g. electrodes) ordinarily at some of the partition walls at the circumference or inside the circumference, by brazing, welding or the like, to obtain a honeycomb heater capable of generating heat when electrified. The electrification means is not particularly restricted as long as it can supply an electric current from a power source to the honeycomb body, and a preferable example is electrodes.

The metallic honeycomb body, when used as a heater, is preferably formed so as to have a total resistance of 0.001–0.5 Ω

It is preferable to load a catalyst on the surfaces of the above metallic honeycomb body because when the resulting honeycomb body is used as a heater or a catalytic converter, a higher temperature can be obtained in the purification reaction (e.g. oxidation reaction) of exhaust gas.

The catalyst loaded on the surfaces of the metallic honeycomb body comprises a heat-resistant carrier having a large surface area and a catalyst component loaded thereon. The heat-resistant carrier having a large surface area is preferably an inorganic oxide, and typical examples thereof are $\gamma$-$Al_2O_3$, $TiO_2$, $SiO_2$-$Al_2O_3$ and lanthanum-cobalt of perovskite structure. The catalyst component includes, for example, noble metals such as Pt, Pd, Rh, Ir and the like; and base metals such as Cu, Cr, Co and the like. A catalyst comprising $\gamma$-$Al_2O_3$ and 10–100 g/ft$^3$ of Pt and/or Pd loaded thereon is preferable.

In the present invention, the shape of the honeycomb body is not particularly restricted. But, as an example, such a specific shape is preferable that the cell density is 6–1,500 cells/in$^2$ (0.9–233 cells/cm$^2$) and the partition wall thickness is 50–2,000 $\mu$m.

The partition walls, etc. constituting the present honeycomb body may be porous or nonporous as mentioned above and its porosity is not restricted. However, the porosity is preferably 0–50%, more preferably less than 25% in view of the strength, oxidation resistance and corrosion resistance. When a catalyst is loaded on the honeycomb body, the porosity of the honeycomb body is preferably 5% or more in view of the adhesion to the catalyst layer.

Incidentally, in the present invention, the honeycomb body refers to a one-piece structure having a large number of passages defined by partition walls. The external shape of the honeycomb body can be cylindrical, rectangular, oval or the like. The passages are preferably nearly parallel to each other from the standpoints of pressure loss, etc. The sectional shape of each passage (i.e. cell shape) may be any desired one such as circular, polygonal, corrugated or the like.

The embodiments of the present invention are hereinafter described with reference to the accompanying drawings. However, the present invention is not restricted to these embodiments.

Figure 2:
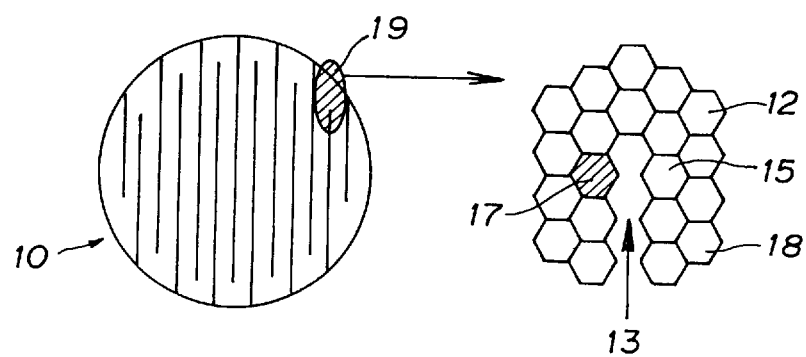
FIG. 2 is a sectional view of the honeycomb body of FIG. 1, showing the portion of the honeycomb body where the partition wall thickness at each intersection point of partition walls must be made larger.
Figure 3:
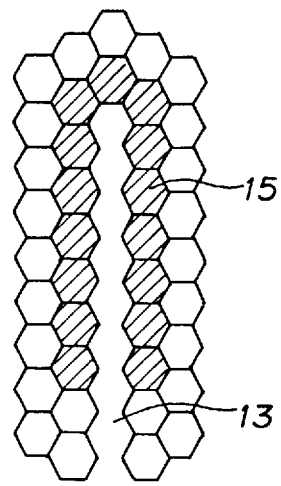
FIG. 3 is a sectional view of the honeycomb body of FIG. 1, showing the portion of the honeycomb body where the partition wall thickness at each intersection point of partition walls must be made larger.

FIG. 1 is a sectional view of an example of the honeycomb body of the present invention wherein the partition wall thickness of cells in the vicinity of each outer-slit end is made larger at each intersection point of partition walls; and FIGS. 2 and 3 are each a sectional view of the honeycomb body of FIG. 1, showing the portion of the honeycomb body where the partition wall thickness at each intersection point of partition walls must be made larger. In these figures, 10 is a honeycomb body comprising: a large number of passages 12 which are defined by partition walls 11 made of an electroconductive material and which are substantially parallel to the direction of a gas flowing through the honeycomb body, and two ends which are the gas inlet and outlet sides of the honeycomb body. In the honeycomb body 10 are formed slits 13 parallel to the passages 12. Numeral 14 designate electrodes attached to the circumference of the honeycomb body; and 18 is cells each consisting of a passage and partition walls.

In such a honeycomb body 10, reduction in current density and temperature is possible in the vicinity 15 of each outer-slit end where current concentration and consequent temperature rise take place during repeated electrification, by making larger the partition wall thickness at each intersection point 16 of partition walls at said vicinity 15 of each outer-slit end. By thus using a larger partition wall thickness at each intersection point of partition walls, cell deformation can be minimized and stress concentration can be relaxed.

"Each outer slit 19 close to each electrode 14 attached to the circumference of the honeycomb body" refers generally to three outermost slits although the number of such slits varies depending upon the size of honeycomb body and the number of slits formed therein. The present inventors found that cell rupture occurs, in many cases, in the vicinity of the end of each slit adjacent to the outermost slit. Therefore, it is appropriate that temperature measurement is made for the cell 17 (shown in FIG. 2) which is a cell at one side of the slit adjacent to the outermost slit and is located adjacent to the dead end of said slit and the obtained temperature is compared with the temperature of the honeycomb center or the temperature of the end of the central slit of the honeycomb body.

"The vicinity 15 of each outer-slit end wherein the partition wall thickness at each intersection point of partition walls is made larger" refers, as shown in FIG. 3, to not only the cells at the dead end of each outer slit 13 but also four or more, preferably five to six cells at each side of the end of each outer slit 13. The number of these cells varies depending upon the cell density (and passage size) of the honeycomb body.

By thus using a larger partition wall thickness at each intersection point 16 of partition walls, stress can be relaxed at the intersection point (where stress concentration occurs) and cell rupture can be prevented.

The extent of increase in partition wall thickness at the intersection point of partition walls is preferably 20–50% of the partition wall thickness at other intersection points where no increase is made.

In the honeycomb body of FIGS. 1, 2 or 3, since increase in partition wall thickness is made only at each intersection point 16 of partition walls 11, decrease in electric resistance is small. Therefore, the honeycomb body is suitable as a honeycomb heater of high electric resistance which is effectively used in automobiles during cold start.

Figure 4:
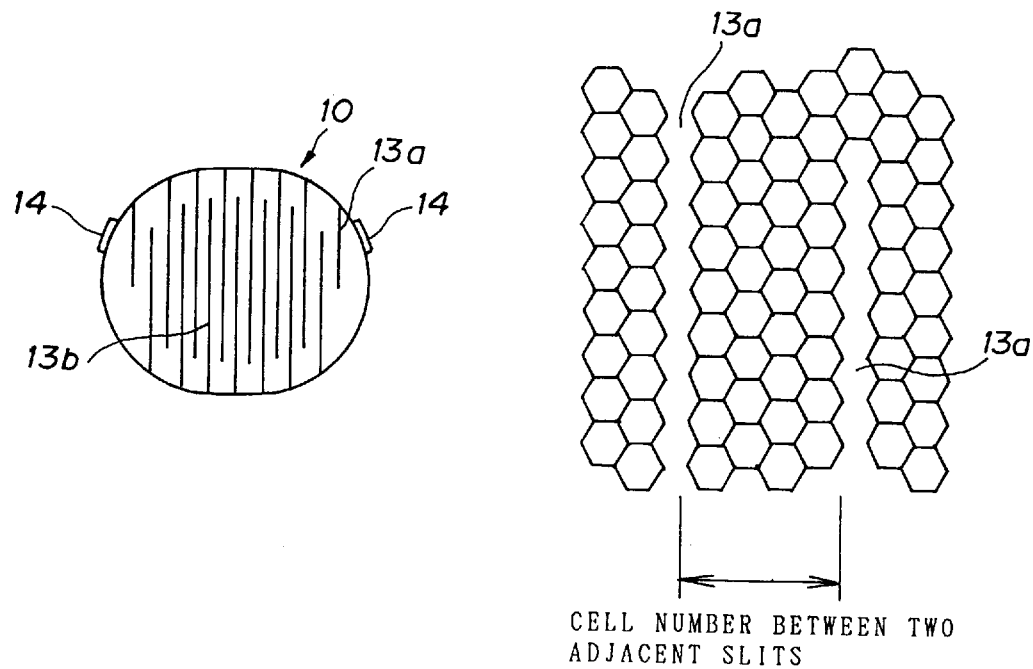
FIG. 4 is a sectional view of an example of the honeycomb body of the present invention wherein the cell number between two adjacent slits is larger in outer slits close to each of the electrodes attached to the honeycomb body, than in inner slits and which has a race track-like sectional shape in the direction normal to the direction of a gas flowing through the honeycomb body.
Figure 5:
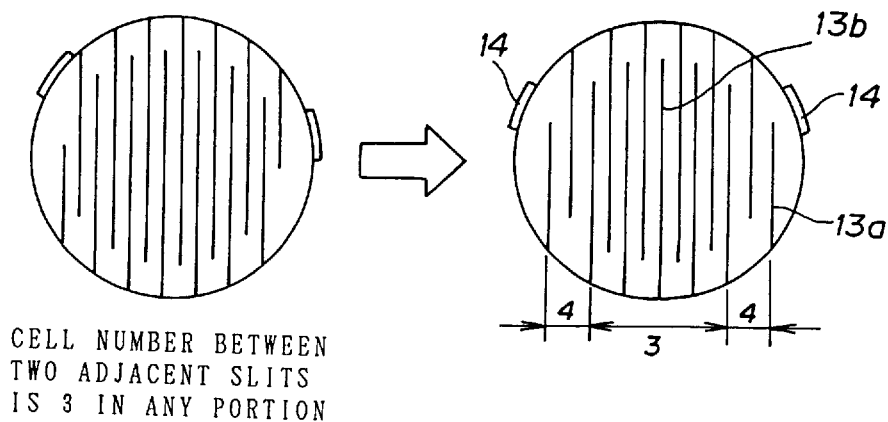
FIG. 5 is a sectional view of an example of the honeycomb body of the present invention wherein the cell number between two adjacent slits is larger in outer slits close to each of the electrodes attached to the honeycomb body, than in inner slits and which has a circular sectional shape in the direction normal to the direction of a gas flowing through the honeycomb body.

FIGS. 4 and 5 are each a sectional view of an example of the honeycomb body of the present invention wherein the cell number between two adjacent slits is made larger in outer slits close to each electrode attached to the honeycomb body, than in inner slits. The honeycomb body of FIG. 4 has a race track-like sectional shape in the direction normal to the direction of a gas flowing through the honeycomb body, and the honeycomb body of FIG. 4 has a circular sectional shape in the same direction.

In each of the honeycomb bodies of FIGS. 4 and 5, the cell number between two adjacent slits is increased to 4 in outer slits 13a close to each electrode 14 attached to the circumference of the honeycomb body 10 while the cell number between two adjacent slits is 3 in inner slits 13b.

By thus forming slits in a honeycomb body, it is possible that the center of the honeycomb body is heated to a higher temperature and the temperature of the vicinity of the end of each outer slit close to each electrode attached to the honeycomb body (cell rupture occurs at said vicinity of the end of each outer slit during repeated electrification) is kept at a lower temperature. Thereby, the honeycomb body can have improved durability to repeated electrification.

Figure 6:
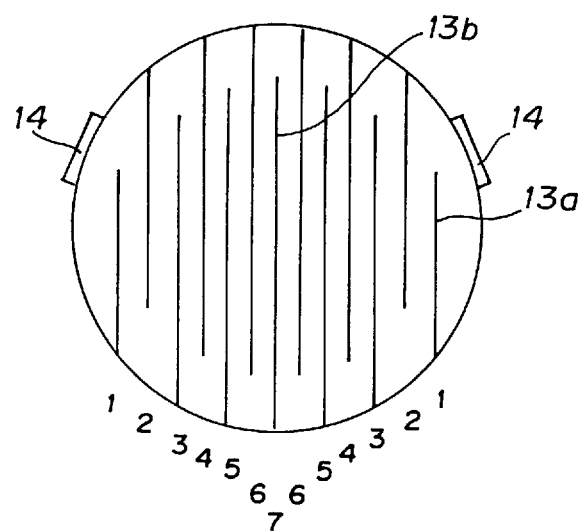
FIG. 6 is a sectional view of an example of the honeycomb body of the present invention wherein the cell number between two adjacent slits is larger in outer slits close to each of the electrodes attached to the honeycomb body, than in inner slits and which has a circular sectional shape in the direction normal to the direction of a gas flowing through the honeycomb body.

The portion in which the cell number between two adjacent slits is made larger than in the honeycomb center, is preferably three outermost slits close to each electrode 14, as shown in FIG. 6. It is generally preferable that the cell number between two adjacent slits is made larger by 1–2 cells in outer slits than in central slits.

With respect to the temperature difference between the vicinity of the end of each outer slit close to each electrode 14 and the end of each central slit, the temperature at the vicinity of the end of each outer slit (where the cell number between two adjacent slits is increased) is lower than the temperature at the honeycomb center or the temperature at the end of each inner slit by preferably at least 50° C., more preferably about 100° C.

Figure 7:
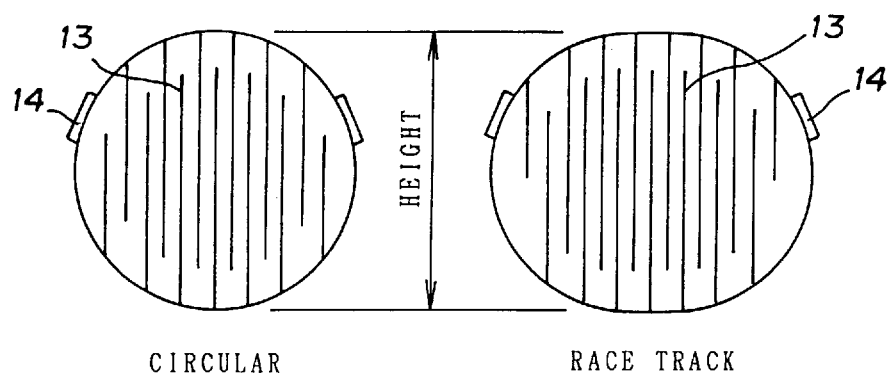
FIG. 7 is sectional views of examples of the honeycomb body of the present invention which have a circular or race track-like sectional shape in the direction normal to the direction of a gas flowing through the honeycomb body.

FIG. 7 is sectional views of examples of the honeycomb body of the present invention which have a circular or race track-like sectional shape in the direction normal to the direction of a gas flowing through the honeycomb body.

When comparison is made between a honeycomb body having a circular sectional view and a honeycomb body having a race track-like sectional view wherein slits 13 are formed in the direction of the minor (shorter) axis and when the two honeycomb bodies have the same sectional area, the latter honeycomb body can have shorter lengths for inner slits 13 and a higher natural frequency and, as a result, can have improved resistance to vibration during actual use. When comparison is made between the above two honeycomb bodies but when they have the same height as shown in FIG. 7, the latter honeycomb body (having a race track-like sectional view) can show a larger electric resistance (higher heat generation) when electrified. Incidentally, the race track-like honeycomb body shown in FIG. 7 may be an oval honeycomb body, and the oval honeycomb body shows substantially the same effects.

In the present invention, the above-mentioned various embodiments can be used independently; however, as a matter of course, they can be used in combination. For example, it is possible that a honeycomb body having a race track-like sectional view is used, the partition wall thickness of cells in the vicinity of the end of each outer slit close to each electrode is made larger at each intersection point of partition walls, and/or the cell number between two adjacent slits is made larger in outer slits close to each electrode than in inner slits. The honeycomb body formed as above can have even higher durability to repeated electrification and even higher resistance to vibration.

Figure 8:
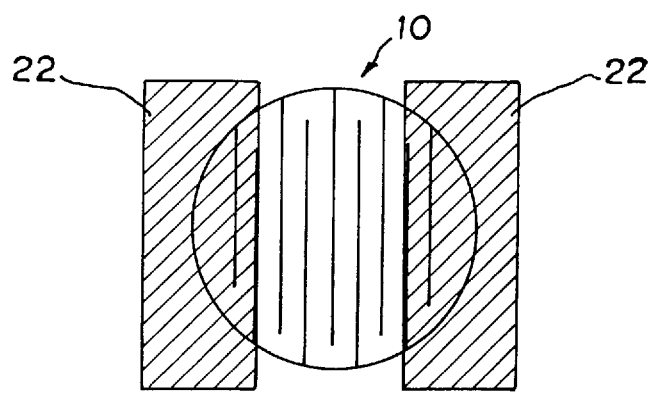
FIG. 8 shows an example of the honeycomb unit of the present invention wherein the circumferential constraint of the honeycomb body constituting the unit is relaxed.
Figure 9:
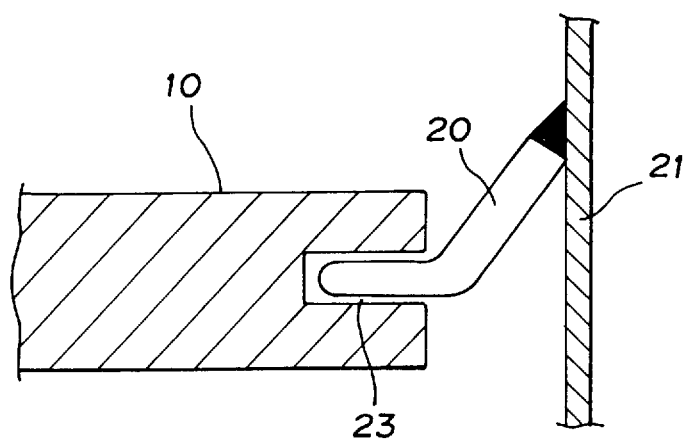
FIG. 9 shows an example of the honeycomb unit of the present invention, comprising a honeycomb body, a metallic casing and a ring-shaped supporting member for fixing the honeycomb body to the metallic casing.

FIG. 8 shows an example of the honeycomb unit of the present invention wherein the circumferential constraint of the honeycomb body constituting the unit is relaxed; and FIG. 9 shows an example of the honeycomb unit of the present invention, comprising a honeycomb body, a metallic casing and a ring-shaped supporting member for fixing the honeycomb body to the metallic casing. As shown in FIG. 9, a honeycomb body 10 is generally fixed to a metallic casing 21 via a ring-shaped supporting member 20. In this case, however, the dent 23 of the honeycomb body 10 and the ring-shaped supporting member 20 are not bonded (fixed) with an adhesive or the like, at the circumferential portion (the slant line portion in FIG. 8) of the honeycomb body close to each electrode 14, whereby the constraint of the honeycomb body 10 is relaxed at said portion. The thus-formed honeycomb unit hardly causes cell rupture during repeated electrification and has improved durability.

In this honeycomb unit, the above-mentioned measure can be taken to "make lower the temperature of the vicinity of the end of each outer slit close to each electrode, than the temperature of the honeycomb center or the temperature of each inner-slit end". The resulting honeycomb unit can have even higher durability to repeated electrification.

As explained above, the honeycomb body according to the present invention can have improved durability to repeated electrification and improved resistance to vibration.

Further, the honeycomb unit according to the present invention hardly causes cell rupture when subjected to repeated electrification and can have improved durability.

What is claimed is:

1. An electrically heatable honeycomb body comprising:
a plurality of passages defined by partition walls comprising electroconductive material and which are substantially parallel to a direction of gas flow through the honeycomb body,
two ends corresponding, respectively, to a gas inlet and gas outlet side, and
slits for controlling, upon electrification of the honeycomb body, the flow of electricity therein and consequently the heat generation therein, said slits being formed such that the cell number between two adjacent slits is larger in outer slits close to electrodes attached to the honeycomb body compared to the cell number between two adjacent inner slits, whereby when electrified the temperature of the end of each outer slit close to each of the electrodes is lower than the temperature of the center of the honeycomb body or the temperature of the end of each inner slit.

2. A honeycomb body according to claim 1, wherein the temperature of said end of each outer slit is lower by at least 50° C. than the temperature of the center of honeycomb body or the temperature of the end of each inner slit.

3. A honeycomb body according to claim 1, wherein in the passages surrounding said end of each outer slit close to each of the electrodes attached to the honeycomb body, the thickness of partition walls is made larger at the intersection points of partition walls.

4. A honeycomb body according to claim 1, which has a circular, race track-like or oval cross-sectional shape in the direction normal to the direction of a gas flowing through the honeycomb body.

5. A honeycomb unit comprising:
a honeycomb body comprising a plurality of passages defined by partition walls comprising electroconductive material and which are substantially parallel to a direction of gas flow through the honeycomb body, and two ends corresponding, respectively, to a gas inlet and a gas outlet side, and
a metallic casing containing said honeycomb body via a ring-shaped supporting member,
wherein the honeycomb body and the ring-shaped supporting member are not bonded together at the circumferential portions of the honeycomb body, close to the electrodes attached to the honeycomb body, whereby the honeycomb body is loosely constrained in the metallic casing by said ring-shaped supporting member.

* * * * *